(12) United States Patent
Herwald

(10) Patent No.: US 7,215,091 B2
(45) Date of Patent: May 8, 2007

(54) METHOD FOR CONTROLLING A DC PRINTER MOTOR WITH A MOTOR DRIVER

(75) Inventor: Marc A. Herwald, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 490 days.

(21) Appl. No.: 10/336,183

(22) Filed: Jan. 3, 2003

(65) Prior Publication Data

US 2004/0130278 A1 Jul. 8, 2004

(51) Int. Cl.
*H02P 3/08* (2006.01)

(52) U.S. Cl. .............. 318/254; 318/138; 318/439; 318/599; 318/685; 318/696

(58) Field of Classification Search ............. 318/138, 318/254, 439, 685, 696, 327, 599, 432, 434, 318/257, 799–812, 215, 218; 388/800–812; 347/215, 218
See application file for complete search history.

(56) References Cited

U.S. PATENT DOCUMENTS

| | | | | |
|---|---|---|---|---|
| 3,886,459 A | * | 5/1975 | Hufford et al. ............. 327/115 |
| 3,931,557 A | * | 1/1976 | Osburn .................... 318/434 |
| 4,114,079 A | * | 9/1978 | Miyakita .................. 318/601 |
| 4,280,082 A | * | 7/1981 | Acharya et al. ............ 388/811 |
| 4,623,826 A | * | 11/1986 | Benjamin et al. ........... 318/254 |
| 4,680,516 A | * | 7/1987 | Guzik et al. ............... 388/812 |
| 4,705,412 A | | 11/1987 | Matsumoto |
| 4,775,945 A | | 10/1988 | Cavill et al. |
| 4,777,609 A | | 10/1988 | Cavill et al. |
| 4,780,653 A | * | 10/1988 | Bezos et al. .............. 388/822 |
| 4,789,874 A | | 12/1988 | Majette et al. |
| 5,012,168 A | * | 4/1991 | Dara et al. ................ 318/434 |
| 5,177,422 A | * | 1/1993 | Kataoka et al. ............ 318/696 |
| 5,207,520 A | | 5/1993 | Tanaka |
| 5,329,214 A | * | 7/1994 | Williamson et al. ........ 318/434 |
| 5,367,236 A | * | 11/1994 | Salazar ................... 318/567 |
| 5,608,443 A | * | 3/1997 | Palmer et al. ............. 347/218 |
| 5,625,279 A | | 4/1997 | Rice et al. |
| 5,677,577 A | | 10/1997 | Barbehenn et al. |

(Continued)

FOREIGN PATENT DOCUMENTS

EP        0589668 A1 *  9/1993

(Continued)

*Primary Examiner*—Lincoln Donovan
*Assistant Examiner*—Tyrone Smith
(74) *Attorney, Agent, or Firm*—Thompson Hine LLP

(57) ABSTRACT

A method of the invention is for controlling a DC printer motor with a motor driver during a potential stall of the DC printer motor. One step of the method includes detecting the start of the potential stall of the DC printer motor. Another step includes thereafter during the potential stall using an input to the motor driver which corresponds to a pulsed desired motor voltage. A further step includes outputting from the motor driver a control voltage to the DC printer motor based on the input. In one example of the method, the start of a potential stall of a DC printer motor is detected at least one time when a printhead carrier moved by a DC printer motor of an inkjet printer encounters a capping device of the inkjet printer while returning to the printer sidewall home position of the printhead carrier.

15 Claims, 3 Drawing Sheets

U.S. PATENT DOCUMENTS

| | | |
|---|---|---|
| 5,748,206 A | 5/1998 | Yamane |
| 5,793,177 A * | 8/1998 | Chia .......................... 318/685 |
| 5,898,288 A | 4/1999 | Rice et al. |
| 6,239,564 B1 * | 5/2001 | Boe et al. ................... 318/254 |
| 6,354,690 B1 | 3/2002 | Murakami |
| 6,390,579 B1 | 5/2002 | Roylance et al. |
| 6,390,596 B1 | 5/2002 | Jeon |
| 6,443,547 B1 | 9/2002 | Takahashi et al. |

FOREIGN PATENT DOCUMENTS

| | | | |
|---|---|---|---|
| JP | 57-152978 | * | 9/1982 |

* cited by examiner

METHOD FOR CONTROLLING A DC PRINTER MOTOR WITH A MOTOR DRIVER

TECHNICAL FIELD

The present invention relates generally to printers, and more particularly to a method for controlling a DC printer motor with a motor driver.

BACKGROUND OF THE INVENTION

A printer is any printing apparatus which prints on a print medium such as an inkjet printer, a laser printer, a copy machine, a fax machine, etc. Printers include a conventional inkjet printer having a DC printer motor which moves the printhead carrier across the print medium for ejecting ink thereon. The DC printer motor is driven by a motor driver using PI (proportional integral) closed-loop control of the carrier velocity.

A DC adapter, which converts AC power to DC power, is used to power the motor driver. A velocity error is computed as the difference between the measured velocity of the printhead carrier and the desired velocity of the printhead carrier. A digital controller calculates an input to the motor driver which corresponds to the desired motor voltage and which is equal to the sum of a first term which is proportional to the velocity error and a second term which is proportional to the time integral of the velocity error.

A typical desired velocity of the printhead carrier has a desired velocity versus time profile having a trapezoidal shape. The desired velocity of the printhead carrier has a beginning increasing velocity versus time portion, a middle constant velocity versus time portion, and an ending decreasing velocity versus time portion. The initial time is the time at the start of a printhead carrier move, and the final time is the time at the end of the printhead carrier move. The measured velocity of the printhead carrier is obtained using an encoder. The motor driver outputs a control voltage, which is a pulse-width-modulated (PWM) control voltage, to the DC printer motor based on the input to the motor driver.

A potential DC printhead motor stall can occur when the printhead carrier encounters the capping mechanism on the way to the printer sidewall home position of the printhead carrier. When this occurred, the previously-described conventional input to the motor driver would rise to beyond eighty-five percent of the DC adapter voltage. However, the digital controller would limit such input to the eighty-five percent level for thirty milliseconds and then step down to seventy percent for seventy milliseconds to avoid exceeding the thermal limit of the motor driver or the DC adapter or the DC printer motor. Such limits still allowed the printhead carrier to overcome the peak force of the capping device to avoid a DC motor stall and to reach the printer sidewall home position. Thus, such conventional DC printer motor control is a closed-loop control which uses a PI-velocity-error-derived desired motor voltage input to the motor driver before a potential stall is detected and which limits such PI-velocity-error-derived desired motor voltage input as above-described during the potential stall.

Other DC printer motors include those which move the top sheet of print medium from an input tray and those which move a sheet of print medium between print swaths. Potential stalls of such other DC printer motors occur when the sheet of print medium encounters a potential "paper" jam.

What is needed is an improved method for controlling a DC printer motor with a motor driver.

SUMMARY OF THE INVENTION

A first method of the invention is for controlling a DC printer motor with a motor driver during a potential stall of the DC printer motor and includes steps a) through c). Step a) includes detecting the start of the potential stall of the DC printer motor. Step b) includes thereafter during the potential stall using an input to the motor driver which corresponds to a pulsed desired motor voltage. Step c) includes outputting from the motor driver a control voltage to the DC printer motor based on the input.

A second method of the invention is for controlling a DC printer motor with a motor driver during a potential stall of the DC printer motor and includes steps a) through c). Step a) includes detecting the start of the potential stall of the DC printer motor. Step b) includes thereafter during the potential stall using an input to the motor driver which corresponds to a pulsed desired motor voltage; wherein the pulsed desired motor voltage has a pulsed desired motor voltage versus time profile including a pulse ramp-up period having a plurality of ramp-up voltage pulses consecutively increasing in pulse height. Step c) includes outputting from the motor driver a control voltage to the DC printer motor based on the input.

A third method of the invention is for controlling a DC printer motor with a motor driver during a potential stall of the DC printer motor while it tries to move a printhead carrier of an inkjet printer past a capping device of the inkjet printer. The third method includes steps a) through c). Step a) includes detecting the start of the potential stall of the DC printer motor when the printhead carrier encounters the capping device. Step b) includes thereafter during the potential stall using an input to the motor driver which corresponds to a pulsed desired motor voltage; wherein the pulsed desired motor voltage has a pulsed desired motor voltage versus time profile including a pulse ramp-up period having a plurality of ramp-up voltage pulses consecutively increasing in pulse height, and wherein the pulsed desired motor voltage versus time profile also includes a substantially constant and non-zero inter-pulse voltage between adjacent ramp-up voltage pulses. Step c) includes outputting from the motor driver a control voltage to the DC printer motor based on the input.

Several benefits and advantages are derived from one or more of the methods of the invention. For example, using a pulsed desired motor voltage instead of a conventional non-pulsed PI-velocity-error-derived desired motor voltage when a potential stall of a DC printer motor is detected can allow the stall to be avoided while decreasing the likelihood of DC adapter de-regulation. In one experiment, a printhead carrier stall against a capping device in an inkjet printer was avoided using one implementation of a method of the invention with about a twenty-two percent reduction in average power required from the DC adapter than using the conventional control method. This allows a less-expensive lower-wattage DC adapter to be used in the inkjet printer.

The pulses of a pulsed desired motor voltage cause a jack-hammer-type force to be applied to the printhead carrier. Having a pulse ramp-up period can allow the printhead carrier the potential of overcoming the capping device with the least force, thereby avoiding an unwelcome noise of a printhead carrier slamming into the printer sidewall after clearing the capping device. Having an inter-pulse voltage between adjacent ramp-up pulses can prevent the printhead carrier from bouncing back from the capping device between ramp-up voltage pulses.

DETAILED DESCRIPTION

Figure 1:
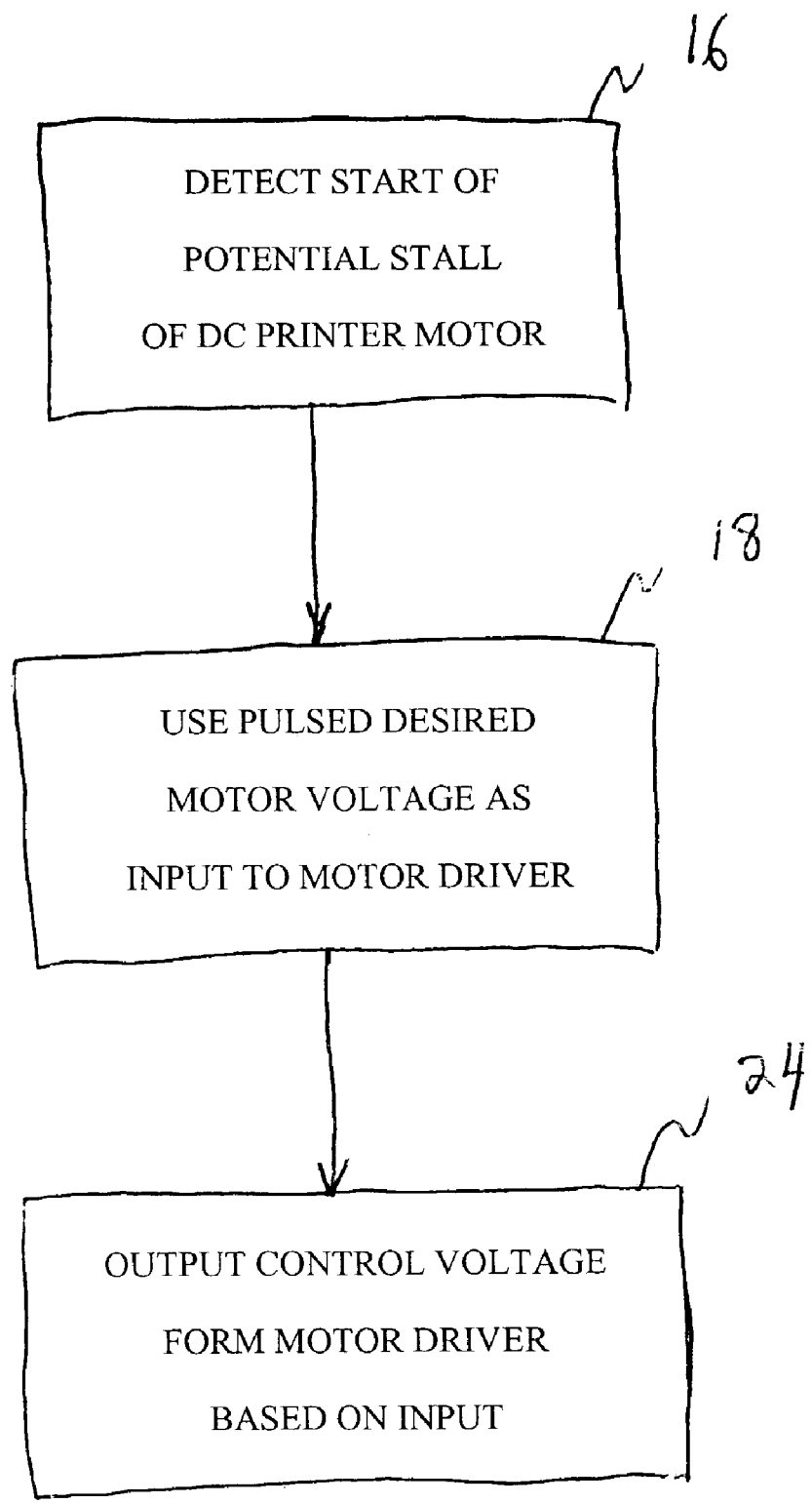
FIG. 1 is flow chart of a first method of the invention for controlling a DC printer motor with a motor driver during a potential stall of the DC printer motor.
Figure 2:
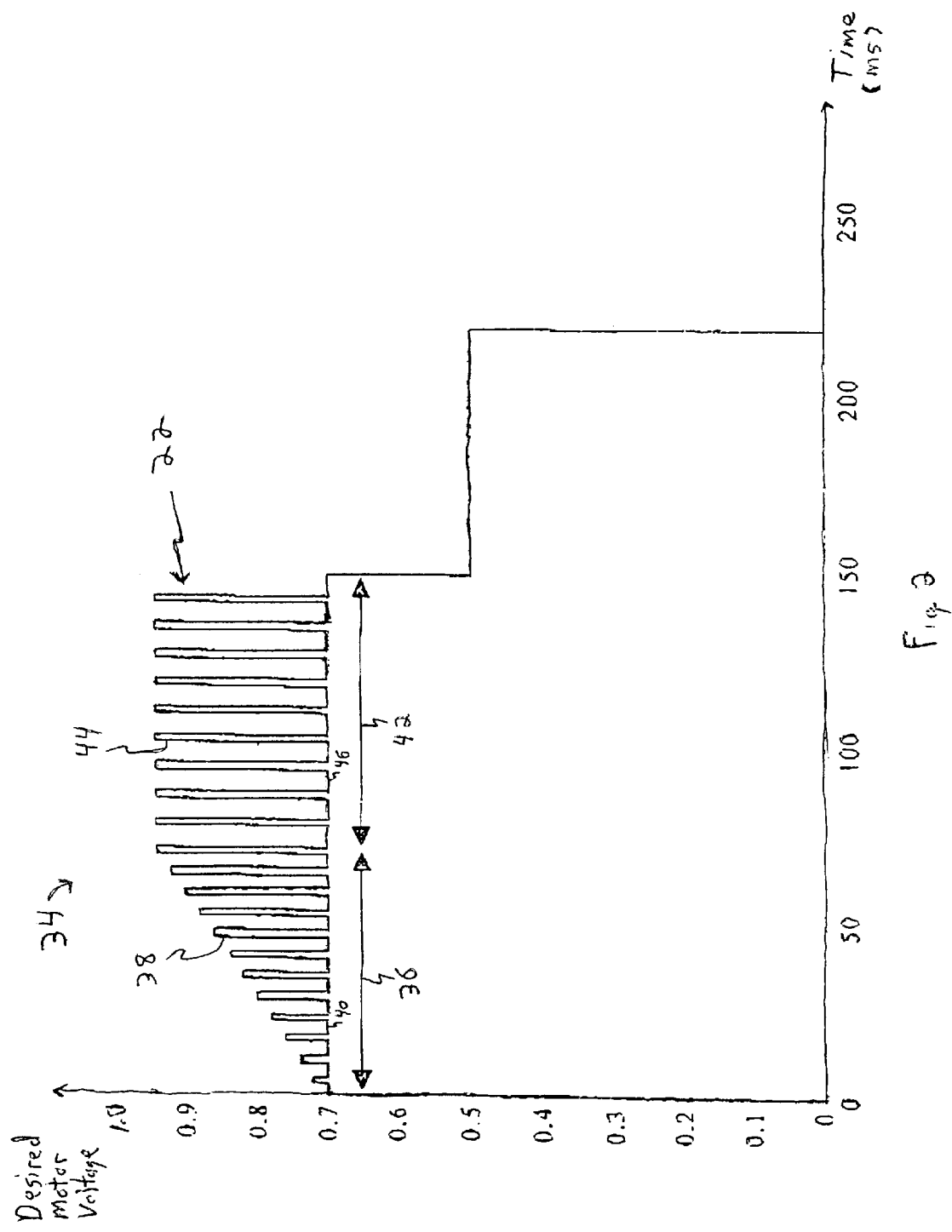
FIG. 2 is an embodiment of a pulsed desired motor voltage versus time profile, wherein an input corresponding to the pulsed desired motor voltage is used as an input to the motor driver of the method of FIG. 1.
Figure 3:
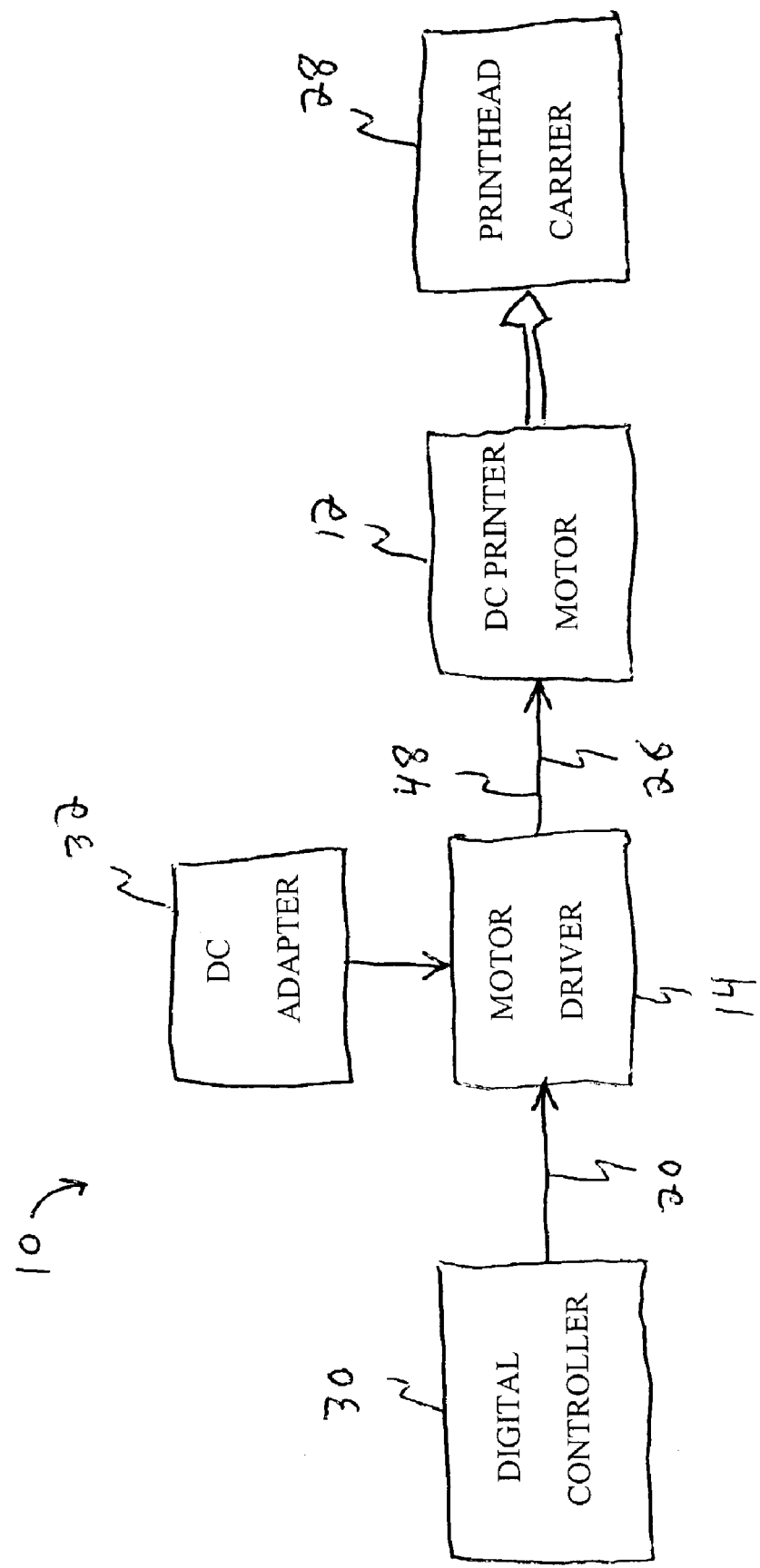
FIG. 3 is a block diagram of an embodiment of an inkjet printer assembly employing the first method of FIG. 1.

A first exemplary method of the invention is shown in flow-chart form in FIG. 1 with a non-limiting example of a pulsed desired motor voltage versus time profile shown in FIG. 2 and with a non-limiting example of an inkjet printer assembly 10 employing the first method shown in FIG. 3. As used herein for purposes of describing various embodiments of the invention, the term "printer" in the phrase "DC printer motor" includes any printing apparatus for printing on a print medium such as, without limitation, an inkjet printer, a laser printer, a copy machine, and a fax machine. It is noted that pulse height, pulse width, inter-pulse height, pulse spacing, number of pulses, etc. for the exemplary pulsed desired motor voltage 22 are arbitrary. It also is noted that a pulsed desired motor voltage is a desired motor voltage having at least one pulse and preferably having a plurality of pulses.

DC printer motors which may encounter potential motor stalls include, without limitation, an inkjet DC printer motor which moves the printhead carrier (such as the DC printer motor 12 which moves the printhead carrier 28 in FIG. 3), an inkjet or laser printer DC motor or a copy or fax machine DC motor which moves the top sheet of print medium from an input tray, and an inkjet or laser printer DC motor or a copy or fax machine DC motor which moves a sheet of print medium between print swaths. Other examples of DC printer motors are left to the artisan. In one enablement, a digital controller 30 is used to generate the input 20 to the motor driver 14 and a DC adapter 32 is used to power the motor driver 14. Other examples of how the motor driver 14 receives power and/or is supplied with the input 20 are left to the artisan.

The first method is for controlling a DC printer motor 12 with a motor driver 14 during a potential stall of the DC printer motor 12 and includes steps a) through c). Step a) is labeled as "Detect Start Of Potential Stall Of DC Printer Motor" in block 16 of FIG. 1. Step a) includes detecting the start of the potential stall of the DC printer motor 12. Step b) is labeled as "Use Pulsed Desired Motor Voltage As Input To Motor Driver" in block 18 of FIG. 1. Step b) includes thereafter during the potential stall using an input 20 to the motor driver 14 which corresponds to a pulsed desired motor voltage 22. Step c) is labeled as "Output Control Voltage From Motor Driver Based On Input" in block 24 of FIG. 1. Step c) includes outputting from the motor driver 14 a control voltage 26 to the DC printer motor 12 based on the input 20.

In one implementation of the first method, step a) detects the start of the potential stall when a motor voltage applied to the DC printer motor 12 using a pre-stall control method exceeds a predetermined value. In one example, the pre-stall control method generates a non-pulsed PI-velocity-error-derived desired motor voltage as previously described in the background of the invention section. In one variation, the start of the potential stall is detected when a measured motor voltage of the DC printer motor exceeds a predetermined value. In another variation, the start of the potential stall is detected when a PWM (pulse-width-modulated) motor driver outputs a PWM control voltage to the motor driver which exceeds a predetermined percentage of the PWM duty cycle. Other ways of detecting potential stalls of a DC printer motor are left to the artisan.

In one embodiment, the pulsed desired motor voltage 22 of step b) has a pulsed desired motor voltage versus time profile 34, as shown in FIG. 2, including a pulse ramp-up period 36 having a plurality of ramp-up voltage pulses 38 consecutively increasing in pulse height. In one variation, the ramp-up voltage pulses 38 have substantially the same pulse width. In the same or a different variation, the ramp-up voltage pulses 38 have substantially the same ramp-up pulse spacing between adjacent ramp-up voltage pulses 38. In the same or a different variation, the pulsed desired motor voltage versus time profile 34 also includes a substantially constant and non-zero inter-pulse voltage 40 between adjacent ramp-up voltage pulses 38.

In the embodiment of FIG. 2, the pulsed desired motor voltage versus time profile 34 includes a high-pulse hold period 42 including a multiplicity of high-hold voltage pulses 44 having substantially the same pulse height substantially equal to the pulse height of the last-in-time ramp-up voltage pulse 38, wherein the pulsed desired motor voltage versus time profile 34 additionally includes a substantially constant and non-zero inter-pulse voltage 46 between adjacent high-hold voltage pulses 44 which is substantially equal to the inter-pulse voltage 40 between adjacent ramp-up voltage pulses 38, and wherein the high-pulse hold period 42 immediately follows the pulse ramp-up period 36.

In one variation, the high-hold voltage pulses 44 have substantially the same pulse width. In the same or a different variation, the pulse width of the high-hold voltage pulses 44 is substantially equal to the pulse width of the ramp-up voltage pulses 38. In the same or a different variation, the high-hold voltage pulses 44 have substantially the same high-hold pulse spacing between adjacent high-hold voltage pulses 44, and, to lower the amount of power required, the high-hold pulse spacing between adjacent high-hold voltage pulses 44 is greater than the ramp-up pulse spacing between adjacent ramp-up voltage pulses 38. In one different embodiment, not shown, the profile 34 lacks the pulse ramp-up period 36, and in another different embodiment, not shown, the profile 34 lacks the high-pulse hold period 42. Other examples of profiles 34 are left to the artisan.

In one extension of the first method, there is also included the step of initially choosing pulse characteristics of pulse height, pulse width, pulse spacing, inter-pulse voltage, and pulse number of the ramp-up voltage pulses 38 and the high-hold voltage pulses 44 based on: the mechanical response time of a printer mechanism (e.g., the printhead carrier 28) moved by the DC printer motor 12; the peak potential-stall force expected to be encountered by the printer mechanism; the power and thermal limits of a DC adapter 32 supplying power to the motor driver 14 of the DC printer motor 12; and the thermal limits of the motor driver 14 and the DC printer motor 12. In one variation, the initially-chosen characteristics are predetermined. In a different variation, the initially-chosen pulse characteristics are determined (i.e., chosen) by the printer during at least one calibration run of a printer mechanism moved by the DC printer motor 12. In one modification of either variation, the initially-chosen pulse characteristics are adjusted by the printer if the DC printer motor 12 does not overcome the potential stall of the printhead carrier 28 (or other printer mechanism) encountering the capping device (or other peak load) using the initially-chosen pulse characteristics.

In one application of the first method, the printer mechanism is a printhead carrier 28 of an inkjet printer. In one variation, the start of the potential stall is detected at least one time when the printhead carrier 28 encounters a capping device of the inkjet printer. Other printer mechanisms and/or other examples of potential stalls are left to the artisan.

In one enablement of the first method, the motor driver 14 outputs a pulse-width-modulated (PWM) control voltage 48 to the DC printer motor 12, and the on-times of the pulse-width-modulated control voltage 48 are based on the pulsed desired motor voltage versus time profile 34. It is noted that the pulse-width-modulated control voltage 48 averaged over the time of a pulse width of a ramp-up or high-hold voltage pulse 38 or 44 will substantially equal the voltage of that ramp-up or high-hold voltage pulse 38 or 44. In another enablement, not shown, the pulsed desired motor voltage 22 controls the output of a variable DC-output-voltage power supply which acts as the motor driver.

In one example, the start of a DC motor stall of a printhead carrier 28 encountering a capping device is detected when the motor voltage applied to the DC printer motor 12 by a pre-stall control method exceeds seventy percent of the maximum DC adapter voltage or seventy percent of the duty cycle of a PWM control voltage 48. After the potential stall is detected, the first method of the invention is employed. In this example of the first method, as shown in FIG. 2, consecutive ramp-up voltage pulses 38 of the pulsed desired motor voltage 22 rise by two percent from an initial ramp-up voltage pulse height of seventy-two percent to a final ramp-up voltage pulse height of ninety-four percent as shown in FIG. 2.

The ramp-up voltage pulses 38 have a pulse width of two milliseconds and an inter-pulse spacing of six milliseconds. The pulse width can be selected such that it will not de-regulate the DC power adapter. For example, a pulse width can be chosen such that the capacitors in the system (e.g., a power supply bulk capacitor and a printer bulk capacitor) absorb the pulse load currents. There are nine high-hold voltage pulses 44 having a pulse height of ninety-four percent that follow the last ramp-up voltage pulse 38. The number of high-hold voltage pulses can be chosen to give carrier 28 more time to overcome the force peak of the mechanical load. The high-hold voltage pulses 44 have a pulse width of two milliseconds and an inter-pulse spacing of eight milliseconds.

The inter-pulse voltage 40 between ramp-up voltage pulses 38 is seventy percent. The inter-pulse voltage 46 between high-hold voltage pulses 44 is seventy percent. The spacing between the last ramp-up voltage pulse 38 and the first high-hold voltage pulse 44 is eight milliseconds. After the last high-hold voltage pulse 44, the pulsed desired motor voltage 22 holds for eight milliseconds at seventy percent and then steps down to fifty percent for seventy milliseconds before stepping down to zero with the printhead carrier 28 having past the capping device and stopped at the printer sidewall home position for the printhead carrier 28. Other examples of particular pulse voltages and particular pulse times are left to the artisan.

In one variation, the pre-stall control method is suspended for the entire duration of the profile period. In a different variation, the (reinitialized) pre-stall or another control method replaces the first method of the invention if the potential stall is overcome during the pulse ramp-up and high-pulse hold periods such as whenever the (reinitialized) pre-stall or other control method would apply a motor voltage to the DC printer motor which does not exceed the predetermined value.

A second exemplary method of the invention is for controlling a DC printer motor with a motor driver during a potential stall of the DC printer motor and includes steps a) through c). Step a) includes detecting the start of the potential stall of the DC printer motor. Step b) includes thereafter during the potential stall using an input to the motor driver which corresponds to a pulsed desired motor voltage; wherein the pulsed desired motor voltage has a pulsed desired motor voltage versus time profile including a pulse ramp-up period having a plurality of ramp-up voltage pulses consecutively increasing in pulse height. Step c) includes outputting from the motor driver a control voltage to the DC printer motor based on the input. In one enablement of the second method, the DC printer motor moves a printhead carrier of an inkjet printer, and the start of the potential stall is detected at least one time when the printhead carrier encounters a capping device of the inkjet printer.

A third exemplary method of the invention is for controlling a DC printer motor with a motor driver during a potential stall of the DC printer motor while it tries to move a printhead carrier of an inkjet printer past a capping device of the inkjet printer and includes steps a) through c). Step a) includes detecting the start of the potential stall of the DC printer motor when the printhead carrier encounters the capping device. Step b) includes thereafter during the potential stall using an input to the motor driver which corresponds to a pulsed desired motor voltage; wherein the pulsed desired motor voltage has a pulsed desired motor voltage versus time profile including a pulse ramp-up period having a plurality of ramp-up voltage pulses consecutively increasing in pulse height, and wherein the pulsed desired motor voltage versus time profile also includes a substantially constant and non-zero inter-pulse voltage between adjacent ramp-up voltage pulses. Step c) includes outputting from the motor driver a control voltage to the DC printer motor based on the input. In one implementation of the third method, step a) detects the start of the potential stall when a motor voltage applied to the DC printer motor using a pre-stall control method exceeds a predetermined value, and the control voltage is a pulse-width-modulated control voltage.

Several benefits and advantages are derived from one or more of the methods of the invention. For example, using a pulsed desired motor voltage instead of a conventional non-pulsed PI-velocity-error-derived desired motor voltage when a potential stall of a DC printer motor is detected can allow the stall to be avoided while decreasing the likelihood of DC adapter de-regulation. In one experiment, a printhead carrier stall against a capping device in an inkjet printer was avoided using one implementation of a method of the invention with about a twenty-two percent reduction in average power required from the DC adapter than using the conventional control method. This allows a less-expensive lower-wattage DC adapter to be used in the inkjet printer.

The pulses of a pulsed desired motor voltage cause a jack-hammer-type force to be applied to the printhead carrier. Having a pulse ramp-up period can allow the printhead carrier the potential of overcoming the capping device with the least force, thereby avoiding an unwelcome noise of a printhead carrier slamming into the printer sidewall after clearing the capping device. Having an inter-pulse voltage between adjacent ramp-up pulses can prevent the printhead carrier from bouncing back from the capping device between ramp-up voltage pulses.

The foregoing description of several methods of the invention has been presented for purposes of illustration. It is not intended to be exhaustive or to limit the invention to the precise procedures disclosed, and obviously many modifications and variations are possible in light of the above teaching. It is intended that the scope of the invention be defined by the claims appended hereto.

What is claimed is:

1. A method for controlling a DC motor with a motor driver during a potential stall of the DC motor while it tries to move a printhead carrier of an inkjet printer past a capping device of the inkjet printer comprising the steps of:
   a) detecting the start of the potential stall of the DC motor when the printhead carrier encounters the capping device;
   b) thereafter during the potential stall using an input to the motor driver which corresponds to a desired pulsed motor voltage; wherein the desired pulsed motor voltage has a desired pulsed motor voltage versus time profile including a pulse ramp-up period having a plurality of ramp-up voltage pulses consecutively increasing in pulse height, and wherein the desired pulsed motor voltage versus time profile also includes a substantially constant and non-zero inter-pulse voltage between adjacent ramp-up voltage pulses; and
   c) outputting from the motor driver a control voltage to the DC motor based on the input.

2. The method of claim 1, wherein step a) detects the start of the potential stall when a motor voltage applied to the DC motor using a pre-stall control method exceeds a predetermined value, and wherein the control voltage is a pulse-width-modulated control voltage.

3. A method for controlling a DC motor with a motor driver during a potential stall of the DC motor comprising the steps of:
   a) detecting the start of the potential stall of the DC motor;
   b) thereafter during the potential stall using an input to the motor driver which corresponds to a desired pulsed motor voltage; wherein the desired pulsed motor voltage has a desired pulsed motor voltage versus time profile including a pulse ramp-up period having a plurality of ramp-up voltage pulses consecutively increasing in pulse height; and
   c) outputting from the motor driver a control voltage to the DC motor based on the input, wherein the DC motor moves a printhead carrier of an inkjet printer, and wherein the start of the potential stall is detected at least one time when the printhead carrier encounters a capping device of the inkjet printer.

4. A method for controlling a DC motor with a motor driver during a potential stall of the DC motor comprising the steps of:
   a) detecting the start of the potential stall of the DC motor;
   b) thereafter during the potential stall using an input to the motor driver which corresponds to a desired pulsed motor voltage; and
   c) avoiding a stall of the DC motor by outputting from the motor driver a control voltage to the DC motor based on the input, wherein the desired pulsed motor voltage of step b) has a desired pulsed motor voltage versus time profile including a pulse ramp-up period having a plurality of ramp-up voltage pulses consecutively increasing in pulse height, wherein the ramp-up voltage pulses have substantially the same pulse width, and wherein the ramp-up voltage pulses have substantially the same ramp-up pulse spacing between adjacent ramp-up voltage pulses.

5. A method for controlling a DC motor with a motor driver during a potential stall of the DC motor comprising the steps of:
   a) detecting the start of the potential stall of the DC motor;
   b) thereafter during the potential stall using an input to the motor driver which corresponds to a desired pulsed motor voltage; and
   c) outputting from the motor driver a control voltage to the DC motor based on the input, wherein the desired pulsed motor voltage of step b) has a desired pulsed motor voltage versus time profile including a pulse ramp-up period having a plurality of ramp-up voltage pulses consecutively increasing in pulse height, wherein the ramp-up voltage pulses have substantially the same pulse width, wherein the ramp-up voltage pulses have substantially the same ramp-up pulse spacing between adjacent ramp-up voltage pulses, and wherein the desired pulsed motor voltage versus time profile also includes a substantially constant and non-zero inter-pulse voltage between adjacent ramp-up voltage pulses.

6. The method of claim 5, wherein the desired pulsed motor voltage versus time profile further includes a high-pulse hold period including a multiplicity of high-hold voltage pulses having substantially the same pulse height substantially equal to the pulse height of the last-in-time ramp-up voltage pulse, wherein the pulsed desired motor voltage versus time profile additionally includes a substantially constant and non-zero inter-pulse voltage between adjacent high-hold voltage pulses which is substantially equal to the inter-pulse voltage between adjacent ramp-up voltage pulses, and wherein the high-pulse hold period immediately follows the pulse ramp-up period.

7. The method of claim 6, wherein the high-hold voltage pulses have substantially the same pulse width.

8. The method of claim 7, wherein the pulse width of the high-hold voltage pulses is substantially equal to the pulse width of the ramp-up voltage pulses.

9. The method of claim 8, wherein the high-hold voltage pulses have substantially the same high-hold pulse spacing between adjacent high-hold voltage pulses, and wherein the high-hold pulse spacing between adjacent high-hold voltage pulses is greater than the ramp-up pulse spacing between adjacent ramp-up voltage pulses.

10. The method of claim 9, also including the step of initially choosing pulse characteristics of pulse height, pulse width, pulse spacing, inter-pulse voltage, and pulse number of the ramp-up voltage pulses and the high-hold voltage pulses based on: the mechanical response time of a printer mechanism moved by the DC motor; the peak potential-stall force expected to be encountered by the printer mechanism; the power and thermal limits of a DC adapter supplying power to the motor driver of the DC motor; and the thermal limits of the motor driver and the DC motor.

11. The method of claim 10, wherein the printer mechanism is a printhead carrier of an inkjet printer.

12. The method of claim 11, wherein the start of the potential stall is detected at least one time when the printhead carrier encounters a capping device of the inkjet printer.

13. The method of claim 12, wherein the motor driver outputs a pulse-width-modulated control voltage to the DC motor, and wherein the on-times of the pulse-width-modulated control voltage are based on the desired pulsed motor voltage versus time profile.

14. The method of claim 13, wherein the initially-chosen pulse characteristics are adjusted by the printer if the DC motor does not overcome the potential stall of the printhead carrier encountering the capping device using the initially-chosen pulse characteristics.

15. The method of claim 9, wherein initially-chosen pulse characteristics of pulse height, pulse width, pulse spacing, inter-pulse voltage, and pulse number of the ramp-up voltage pulses and the high-hold voltage pulses are determined by the printer during at least one calibration run of a printer mechanism moved by the DC motor.

* * * * *